United States Patent [19]

Kostich

[11] Patent Number: 5,454,993
[45] Date of Patent: Oct. 3, 1995

[54] METHOD FOR IMMOBILIZING THE INFERIOR PORTION OF THE HUMAN ANATOMY

[76] Inventor: Jeffrey V. Kostich, 8433 Scenic Ridge NW., Clinton, Ohio 44216

[21] Appl. No.: 251,512

[22] Filed: May 31, 1994

[51] Int. Cl.$^6$ .................................................. B29C 33/40
[52] U.S. Cl. ...................... 264/46.4; 264/45.2; 264/46.6; 264/222; 264/DIG. 30; 425/2
[58] Field of Search .................. 264/DIG. 30, 222, 264/46.4, 45.2, 46.6; 425/2

[56] References Cited

U.S. PATENT DOCUMENTS

| | | | |
|---|---|---|---|
| 3,048,169 | 8/1962 | Pierce . | |
| 3,377,416 | 4/1968 | Kandel | 264/222 |
| 3,403,676 | 10/1968 | De Lamar J. Gibbons . | |
| 3,732,578 | 5/1973 | Pollack | 264/222 |
| 4,307,056 | 12/1981 | Meyer | 264/222 |
| 4,327,046 | 4/1982 | Davis et al. | 264/102 |
| 4,347,213 | 8/1982 | Rogers, Jr. | 264/510 |
| 4,450,122 | 5/1984 | Gallina | 264/46.4 |
| 4,622,185 | 11/1986 | Kostich | 264/45.2 |
| 4,828,325 | 5/1989 | Brooks | 264/222 |
| 5,083,910 | 1/1992 | Abshire et al. | 425/2 |

Primary Examiner—Allan R. Kuhns
Attorney, Agent, or Firm—Oldham, Oldham & Wilson Co.

[57] ABSTRACT

An apparatus for immobilizing and positioning the lower or inferior portion of the human for radiographic examination or treatment. The device consists of a framework made from a base board, a plurality of siderails, a foot board and a pair of leg support blocks. A foam mixture is applied to the upper surface of the baseboard and to the leg support blocks and the entire device is placed into a large flexible container or bag. A patient's inferior or lower body portion is placed on the device in a supine position with a leg support block supporting at least one of the legs. The patient remains in a fixed position while the foam mixture expands around the patient's body and the apparatus framework. After a brief period of time, the foam sets or hardens and a mold or template is formed. This mold serves to immobilize the lower portion of the body during radiographic examinations and treatment as well as other procedures. The form can be utilized repeatedly with the same patient in subsequent procedure for duplicating the initial examination or treatment posture.

14 Claims, 2 Drawing Sheets

METHOD FOR IMMOBILIZING THE INFERIOR PORTION OF THE HUMAN ANATOMY

TECHNICAL FIELD

This invention relates generally to an apparatus and method for immobilizing a portion of the human anatomy for procedures such as radiographic examinations and treatment. More specifically, the present invention relates to a method and apparatus for developing a mold or template of the inferior portion of the human anatomy.

BACKGROUND OF THE INVENTION

The efficiency and effectiveness of certain medical procedures can be considerably enhanced if that portion, or those portions, of the patient's anatomy requiring treatment can be quickly and accurately positioned and comfortably supported during successive treatments. This need to be able to accurately to position, and successively reposition, a portion of the patent's anatomy and then maintain it virtually motionless is exemplified by considering a series of radiation treatments. The radiation beam must be projected to an exact location, sometimes interiorly of the body. Such a radiation beam must be most accurate in order not to inflict damage to the tissues surrounding the area to be treated, and as a result there is little margin for error. Not only must the radiation beam be projected accurately toward a particular spot on the body surface, the body must also be precisely oriented to effect the required alignment of the radiation beam from the surface of the body to the interiorly located tissue being treated. Moreover, once the patient is positioned and aligned he/she, must remain as motionless as possible. Radiation treatment generally requires repeated exposures over a period of several weeks. Thus, the difficulties are compounded without a template by which medical personnel can quickly and accurately reposition and support the patient during successive treatments in exactly the same position as initially determined.

Previously, standardized forms have been used which approximate the size of selected portions of the human anatomy. A foam is poured into the form, the patient is positioned within the form, and the foam rises around the contours of the patient and is restricted by the walls of the form. This approach is deficient in that these forms are available in a limited number of standard sizes, typically only pediatric and adult, and, therefore, are not always suitable for a particular patient. Further, the mere size of the standardized forms makes it impractical for a healthcare facility to stock an adequate quantity of numerous sized forms.

Based on these deficiencies, I developed the invention disclosed in U.S. Pat. No. 4,622,185 as a "Method and Apparatus for Molding and Accurately Repositioning Selected Portions of the Human Anatomy", the substance of which is herein incorporated by reference. The device disclosed in that patent consisted essentially of a base containing a plurality of orthogonally disposed grooves or slots. A plurality of slats are provided for removable insertion into the grooves. The slats are cooperatively aligned to substantially encompass the area immediately around that particular portion of the patient's anatomy for which a template is to be formed. A flexible container or bag is placed within the area defined by the slats and a predetermined amount of foam is placed therein. The portion of the patient's body to be molded is placed over the foam filled container and the foam expands around the selected portion of the patient's body. This apparatus and technique is highly versatile and has enjoyed widespread acceptance in the medical community but has limited usefulness when portions of the body are to be elevated. Based on the limitations and deficiencies of the prior art, my invention is herein presented.

SUMMARY OF THE INVENTION

It is, therefore, a primary object of the present invention to provide an improved method and apparatus for immobilizing elevated portions of the human anatomy and specifically the inferior portion of the body, the lower extremities and/or pelvic region.

It is a further object of the present invention to provide an improved method and apparatus for creating an individualized mold for selected portions of the human body and especially the inferior portion of the body, the lower extremities and/or pelvic region.

It is still a further object of the present invention to provide an improved method and apparatus for immobilizing and repositioning the inferior or lower portion of the human anatomy including the lower extremities and/or pelvic region for medical procedures, such as radiographic examinations and treatments.

These and other objects and advantages are accomplished by an improved method and apparatus which in general comprises of a framework made from a base board, a plurality of siderails, a foot board and a pair of leg support blocks. A foam mixture is applied to the upper surface of the baseboard and to the leg support blocks, and the entire device is placed into a large flexible container or bag. A patient's inferior or lower body portion is placed on the device in a supine position with a leg support block supporting at least one of the legs. The patient remains in a fixed position while the foam mixture expands around the patient's body and the apparatus framework. After a brief period of time, the foam sets or hardens and a mold or template is formed.

In this manner, a mold or template is created which can be used to immobilize the lower portion of the human body during certain medical procedures including X-rays, CAT-scans, MRI and other radiographics procedures and therapeutic treatment of patients using external radiation. The template is reused in similar subsequent procedures for placing that portion of the human body in the same position that it was in during the initial procedure, resulting in an increased ability for medical personnel to isolate, examine or treat a target area of the patient's body.

DETAILED DESCRIPTION OF THE PREFERRED EMBODIMENT

Figure 1:
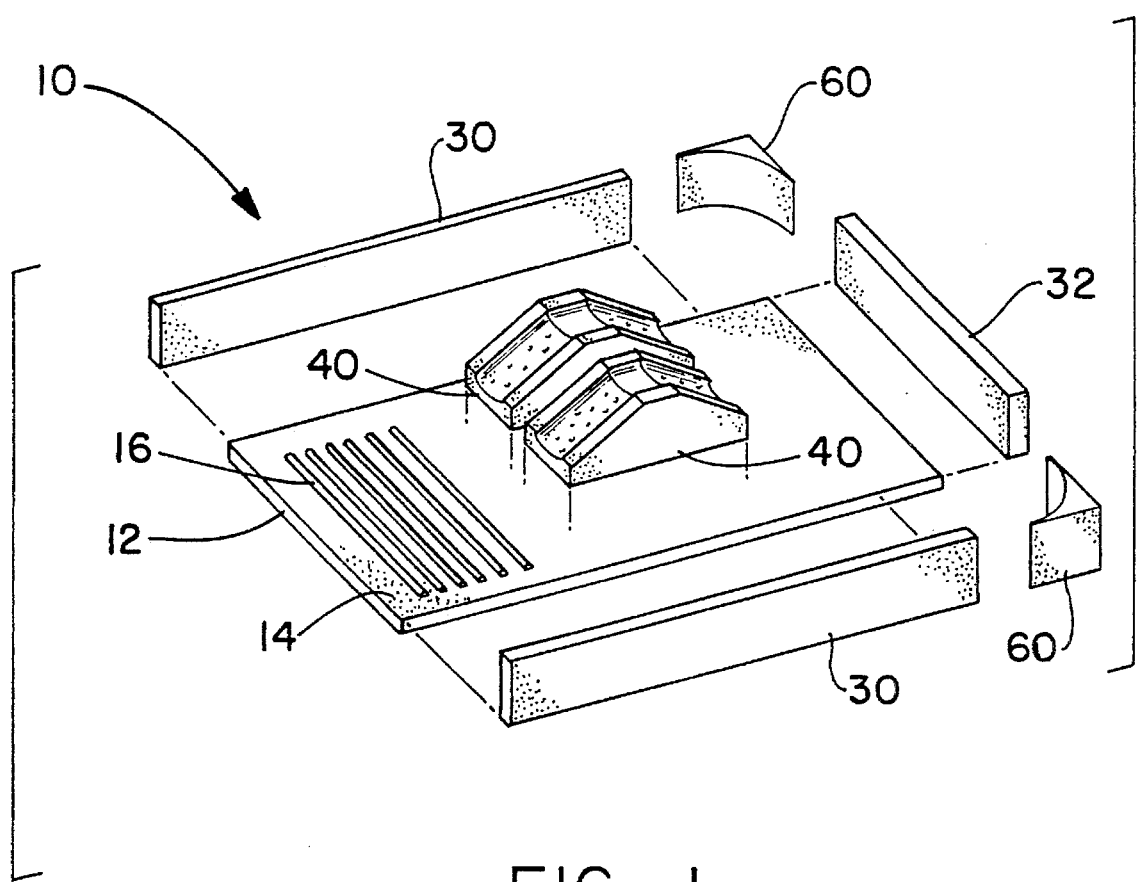
FIG. 1 is an assembly drawing illustrating the various parts of the apparatus for creating a template of the lower portion of the human anatomy according to the present invention.

Now with reference to the invention illustrated in the drawings and specifically FIG. 1, an apparatus for creating a mold or template for the inferior or lower portion of the human body is shown generally by numeral 10. The template forming apparatus consists generally of an essentially planar base 12, a pair of siderails 30, a foot rest 32, a leg support means 40, a flexible bag or container 50, and a foaming mixture 70.

Base 12 is essentially rectangular in shape and has an upper surface 14, although it is appreciated that a variety of alternative shapes are possible. In the preferred embodiment base 12 is composed of an extruded polystyrene material sufficient to support the weight of a patient for which the mold is being created. Numerous other materials would be recognized as suitable by those of ordinary skill in the art.

A pair of siderails 30, preferably made from an expanded polystyrene material and having a length substantially equal to the length of base 12, are attached at or near the periphery of base 12. Siderails 30 are attached to base 12 by means known in the art but preferably contact adhesive or double-sided tape products. The siderails upon attachment to base 12 serve as a ridge means to contain the flow of the liquid foaming mixture subsequently introduced into the apparatus and discussed below. While siderails 30 are shown along only two edges of base 12, they may be employed around the entire periphery of base 12 or any portion thereof. Further, siderails 30, as illustrated, are regular in shape although some modification may be necessary to allow for specific patient positioning.

A footrest 32 may optionally be employed across a substantial width of base 12 either in lieu of or in addition to siderails 30. Similar to siderails 30, footrest 32 is preferably attached to base 12 by means of an adhesive. To accommodate patients of varying size footrest 30 may be positioned inward from the periphery toward the interior of base 12.

Figure 2:
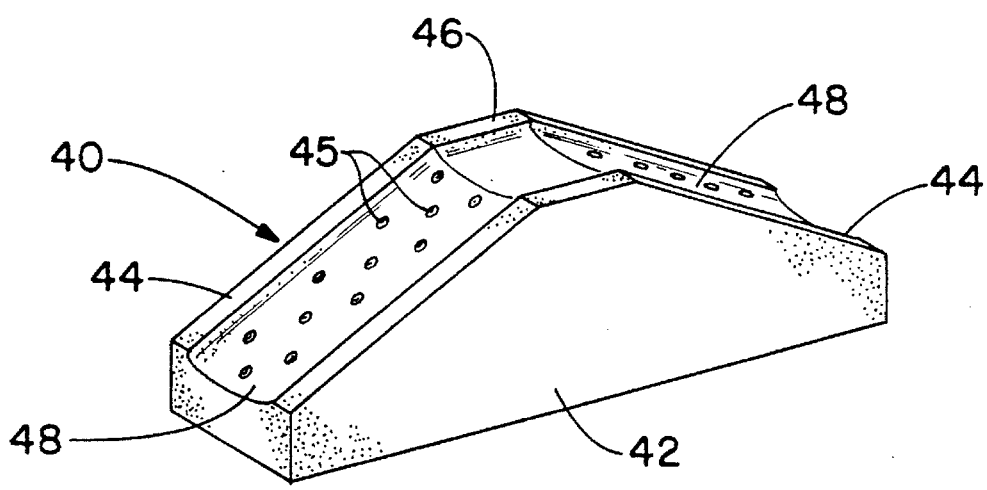
FIG. 2 is a perspective view illustrating one embodiment of a leg support means in accordance with the present invention.

In order to elevate and immobilize the lower extremities of the patient, a leg support means is provided. In any of FIGS. 1–3, leg support means is disclosed as a pair of polystyrene leg support blocks 40, although these could logically be formed as a single unitary structure. In the preferred embodiment as best shown in FIG. 2, each leg support block 40 is shown as having a modified triangular shape having a pair of parallel vertical side walls 42 defining a channel region 48 therebetween. The channel region 48 consists essentially of an upper section 46 flanked on either side by downwardly sloping sides 44. Leg support blocks 40 serve as support for the patient's legs elevating them at the knee region. The channel 48 is generally of a width which allows the patient's leg to seat therein to avoid sliding off the leg support block 40 during either template formation or during repositioning of the lower body in the template. Those of ordinary skill in this art will appreciate that the height, dimensions and/or angles of leg support means/blocks 40 may be varied according the limitations of the patient or the requirements of a specific procedure. Still further, the exact shape of leg support means/blocks 40 should not be seen as limiting the scope of this invention. The leg support blocks are commonly positioned parallel to and on opposite sides of a longitudinal center line of base 12. It is preferred but not required that leg support blocks 40 be attached to base 12.

Optionally, various spacers such as those illustrated by numeral 60 in FIG. 1 may be employed between the patient's body 20 and a siderail 30 or footrest 32 in order to reduce the quantity of foam required and to urge the foam into contact with the patient's body or the structure of the template forming apparatus.

Once the siderails 30, footrest 32, leg support blocks 40 are positioned on base 12, a foam mixture is applied to the base 12 and leg support blocks 40.

Foam mixtures that are suitable for practice of the present invention are not in themselves particularly unique and may include the polyurethane family. Various formulations of the polyurethane family are employed to provide foams having widely disparate, ultimate characteristics. For example, some formulations provide foam that is hydrophilic and are, therefore, eminently suited to be used for supports for floral displays. Other formulations provide foam that possesses antipodal characteristics, and which are, therefore, eminently suited to be used in, or as, flotation devices.

In order to be suitable for use in medical applications, such as the present, foam compositions must exhibit a low foaming temperature so as not to create a potential of causing a burn to the patient. Further, it is desirable that any foam composition have a quick hardening time and have sufficient integrity to immobilize the particular body portion as well as support the necessary weight of the patient. One specific formulation which is well suited to this method and apparatus is the polyurethane foam composition set out in U.S. Pat. No. 4,771,082. This polyurethane foam composition has a maximum foaming temperature of 45 degrees Celsius and hardens in approximately 8–10 minutes.

The basic reaction is that of mixing a polyol and a polyisocyanate such as follows:

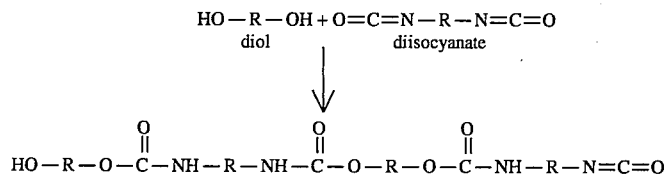

Surfactants, catalysts and blowing agents are generally added in various amounts selectively to provide the desired properties from the wide range available, including such characteristics as hydrophilia rate of rise, rate of cure, amount of heat release, cell size and rigidity. The preferred polyisocyanate for practice of the subject invention is polymethylenepolyvinyl isocyanate, whereas the preferred polyol is a mixture of various polyols such as ethylene glycol, glycerin 2,2 dimethyl-1,3-butanediol, 1,2,4 butanetriol, 1,2,6 hexanetriol and the like.

A typical application of the present invention to mold a template for any selected portion of a patient's anatomy would employ the addition of approximately 100 ml to 350 ml of the polyol to 75 ml to 240 ml of the polyisocyanate.

The chemicals required to form the foam are then mixed together. Typically the polyisocyanate is provided in a bottle larger than that required, and the bottle in which the polyol is provided is emptied into the bottle containing the polyisocyanate. The bottle now contains the mixed polyisocyanate and polyol is then capped and vigorously shaken for approximately 35 seconds. Thereafter, the bottle is opened and the contents are poured onto a base 12 and leg support blocks 40. The foam mixture 70 is spread as evenly as possible over the base and leg support blocks 40.

Figure 3:
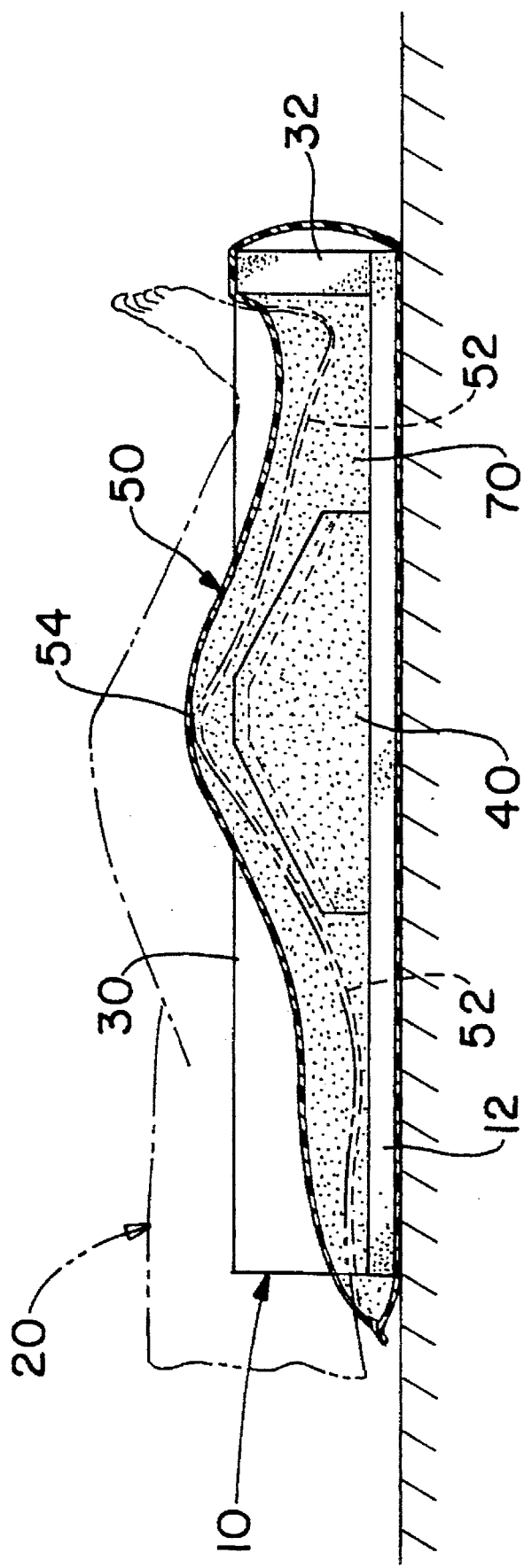
FIG. 3 is an elevational view, partially broken away by the removal of a side member and partially in ghost dot-dashed lines illustrating the application and method of the present invention.

A barrier means is then placed over the entire upper surface 14 of the foam-containing apparatus 10. The barrier means is illustrated in FIG. 3 as a flexible container or bag 50 with the entire apparatus 10 contained therein. Ideally, air is allowed to circulate inside the bag until bubbles are noted in the foam (1–3 minutes). The air is then forced out, the bag is sealed and the patient is placed in the foam. However, a sheeted material placed over the entire upper surface of apparatus 10 and insulating the patient from any contact with the foam mixture can be used. The barrier means must be tear-resistant, flexible and must not react with the selected foam mixture. A suitable barrier means may be fabricated from a pliable, sturdy material such as polyvinyl-chloride (PVC).

Even though PVC has proven to be a perfectly acceptable material, it should be appreciated that the wall thickness of the bag should be no less than approximately 1.5 mils. Hence, some standard refuse bags, even though made of PVC, cannot be used because their wall thickness if too thin. Some industrial refuse bags, and certain brands of those home refuse bags advertised as having "double wall" thickness, or the like, as well as certain brands of waste compactor bags, however, do possess the requisite wall thickness, and they may be employed.

This minimal wall thickness is required to accomplish two objectives. First, a wall thickness of less than 1.5 mils is too subject to tearing or rupturing. The flexible container 50 must provide a controlled confinement for the foam mix, if the invention is to be satisfactorily employed, and the objective cannot be achieved if the flexible container 50 ruptures, or tears. Second, a wall thickness of less than 1.5 mils is too susceptible to wrinkling and could cause an undesirable fold where it might not be visually detectable. Such unobserved folds can capture the foam mixture before it fully foams to create localized "hot spots" that could make the patient uncomfortable, at the least, or, at the worst, burn the patient. Such localized hot spots have been observed to melt the PVC bag at, and around, such a fold. Employing a PVC bag having sufficient wall thickness, however, has been found to obviate this potential problem.

A flattened bag measuring approximately 54×246 inches (137.2 by 61 cm) provides a convenient size that can be readily adapted to virtually any situation, as will become apparent from the hereinafter described exemplary usage.

It is to be understood that the foam mixture 70 can be applied to apparatus 10 as previously explained, after the apparatus has been placed with a flexible container or bag 50.

As illustrated in FIGS. 1 and 2, leg support blocks 40 may contain apertures, indentations or grooves 45 in the channel region 48, and especially along sloped sides 44 in order to retain foam mixture thereon. Similarly, in certain instances base 12 may also contain grooves or indentations for restricting the flow of foam mixture 70 prior to hardening.

After the foam has been applied to the upper surface 14 of base 12 and to the channel region 48 of leg support blocks 40 and the barrier means applied, that portion of the patient's body for which the template or mold is to be made is placed into contact with the apparatus 10 as shown in FIG. 3. As the foam begins to expand and rise, it begins to pull a portion of the barrier means 52 away from apparatus 10 and into conforming contact with the patient's body portion. As the patient remains in a stable non-moving state, the foam hardens to form an impression of the particular body part. The foaming action typically subsides after about fifteen minutes, and thereafter, the patient can be carefully extricated from the newly formed mold. The mold should then be permitted to harden for a period of five to thirty minutes.

Therefore, upon reinsertion into the mold the particular portion of the patient's body to be examined will be returned or repositioned just as it was at the time of mold formation. The resulting apparatus or mold can be used in successive procedures involving the same portion of the body to consistently duplicate the previous positioning and immobilization. The template made in accordance with this invention can also be further modified for the type of treatment desired, for example, by cutting access holes directly through the template.

In the preferred embodiment of the present invention, base 12, siderails 30, footrest 32 and leg support blocks are made from extruded or expanded polystyrene materials because of the material's light weight, durability for this intended purpose and affordability. Even more importantly, polystyrene products are substantially radiolucent. In this way, transmission of irradiation treatment can take place through the apparatus and/or hardened foam with minimal, if any, interference or distortion. However, numerous other material could be used to accomplish the purposes of this invention.

The elements of the present invention can be supplied in the form of a single kit for use with patients of varying size. Only a sized leg support means may need to be selected substituted for some patients.

It should be apparent that the invention accomplishes the objects thereof. As stated, a variety of boards, supports, spacers, foam mixtures and methods of attaching to the base can be employed in the practice of this invention. It is to be understood that such variations are intended to fall within the scope of the claimed invention and that the subject invention is not to be limited by the specific method of operation described and/or depicted by the drawings nor is the invention to be limited by the specific chemical and mechanical components identified and described herein. There have been designated merely to provide a demonstration of operability and the selection of mechanically equivalent arrangements is not deemed a departure from the spirit of the invention being limited solely by the scope of the attached claims.

What is claimed is:

1. A method of forming a mold for repositioning a lower portion of the human anatomy comprising the steps of:

providing a base for supporting a foamed template structure, said base having an interior region and a periphery;

positioning at least one leg support means on said base, said at least one leg support means having an essentially triangular shape in longitudinal cross-section;

applying a foam mixture to the area of said base within said periphery of said base;

placing a barrier means over said base, leg support means and said foam mixture;

positioning said lower portion of the human anatomy onto said barrier means over said base in a supine position with at least one leg over said at least one leg support means such that the knee is generally at an apex of said triangular shape and permitting said foam mixture to rise around said lower portion of said human anatomy; and maintaining said lower portion of the human anatomy in a fixed position for a sufficient length of time for said foam mixture to set and form a mold therefor.

2. The method of forming a mold as recited in claim 1 wherein said at least one leg support means has a pair of parallel vertical walls and a groove therebetween for receiving at least one leg of said lower portion of said human anatomy.

3. The method of forming a mold as recited in claim 1 wherein said leg support means comprises a pair of leg support blocks, said leg support blocks positioned such that the longitudinal axis of each said leg support block is essentially parallel to the other.

4. The method of forming a mold as recited in claim 1 wherein at least a portion of said base contains a plurality of indentations.

5. The method of forming a mold as recited in claim 1 wherein at least a portion of said at least one leg support means contains a plurality of indentations.

6. The method of forming a mold as recited in claim 1 comprising the further step of:

attaching a ridge means around at least a portion of said base.

7. The method of forming a mold as recited in claim 6 comprising the further step of introducing a plurality of spacer means between said ridge means and said human anatomy to maintain said foam in close proximity with said lower portion of the human anatomy.

8. The method of forming a mold as recited in claim 6 comprising the further step of:

positioning at least one spacer means between said ridge means and said lower portion of the human anatomy.

9. The method of forming a mold as recited in claim 1, wherein said foam mixture is produced by mixing the contents of a first container means containing a polyol mixture to the contents of a second container means containing polyisocyanate.

10. The method of forming a mold as recited in claim 9, wherein the ratio of said polyol mixture to said polyisocyanate ranges from about 1:3 to about 5:1.

11. A method of forming a mold for repositioning a lower portion of the human anatomy comprising the steps of:

providing a base for supporting a foamed template structure, said base having an interior region and a periphery;

positioning at least one leg support means on said base, said at least one leg support means having an essentially triangular shape in longitudinal cross-section;

placing a barrier means over said base and said leg support means;

applying a foam mixture to the interior of a barrier means which is a flexible container placed over the area of said base within said periphery of said base;

positioning said lower portion of the human anatomy onto said barrier means over said base in a supine position with at least one leg over said at least one leg support means such that the knee is generally at an apex of said triangular shape and permitting said foam mixture to rise around said lower portion of said human anatomy; and maintaining said lower portion of the human anatomy in a fixed position for a sufficient length of time for said foam mixture to set and form a mold therefor.

12. The method of forming a mold as recited in claim 11 comprising the further steps of;

allowing air to circulate inside of said flexible container for a length of time; and expelling said air from said bag and sealing said bag.

13. The method of forming a mold as recited in claim 11 comprising the further step of:

attaching a ridge means around a least a portion of said base.

14. The method of forming a mold as recited in claim 13 further comprising the step of positioning at least one spacer means positioned between said ridge means and said lower portion of the human anatomy.

* * * * *